Figure 1:
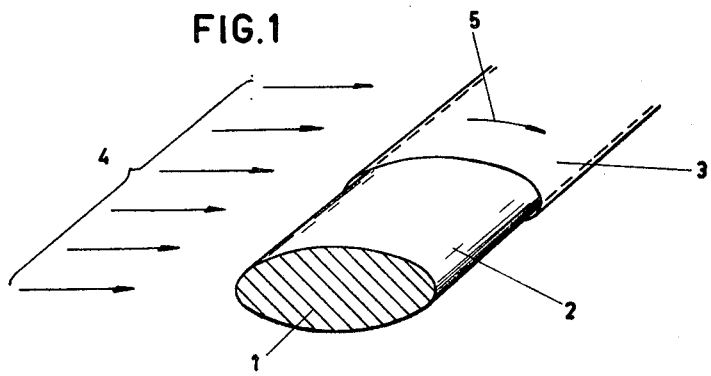

United States Patent
Hirs

[11] 3,734,641
[45] May 22, 1973

[54] AERODYNAMIC OR HYDRODYNAMIC ELEMENT, SUCH AS A WING OR A BLADE

[75] Inventor: Gilles Gerardus Hirs, Pijnacker, Netherlands

[73] Assignee: Nederlandse Organisatie Voor Toegepast-Natuurweten-Schappelijk Onderzoek Ten Behove Van Nijverheid, Handel & Verkeer, The Hague, Netherlands

[22] Filed: May 28, 1971

[21] Appl. No.: 147,860

[30] Foreign Application Priority Data

May 29, 1970   Netherlands ......................... 7007868

[52] U.S. Cl. ........................................................ 416/4
[51] Int. Cl. ................................................ B63h 9/02
[58] Field of Search ......................... 416/4; 415/90; 244/10, 21, 39

[56] References Cited

UNITED STATES PATENTS

R18,122   7/1931   Flettner ................................ 244/10

FOREIGN PATENTS OR APPLICATIONS

| | | | |
|---|---|---|---|
| 552,566 | 6/1932 | Germany | 244/21 |
| 679,434 | 1/1930 | France | 244/21 |
| 726,091 | 2/1932 | France | 244/21 |
| 260,839 | 10/1928 | Italy | 244/21 |
| 112,318 | 12/1925 | Switzerland | 244/10 |

*Primary Examiner*—Everette A. Powell, Jr.
*Attorney*—Hammond & Littell

[57] ABSTRACT

Wings, blades and such aerodynamic and hydrodynamic elements, which are profiled to experience in a stream of a gas or a liquid a transverse force and which are provided with a moving surface constituted by a rotating belt of flexible material to benefit from the Magnus-effect and thus to increase efficiency, are improved by running the belt on a profiled body instead of on rollers. The belt is supported by a film of lubricant which is supplied through holes and distributed by grooves in the body, in such an arrangement that the lubricant flow not only supports the belt but also maintains its rotation.

6 Claims, 5 Drawing Figures

PATENTED MAY 22 1973 3,734,641

SHEET 1 OF 2

INVENTOR.
GILLES GERARDUS HIRS
BY
ATTORNEYS

AERODYNAMIC OR HYDRODYNAMIC ELEMENT, SUCH AS A WING OR A BLADE

The invention relates to an aerodynamic or hydrodynamic element, such as a wing or a blade, which is profiled in order to experience in a stream of fluidum a force with a considerable component transverse to the direction of flow and that for this purpose has over at least part of its length an external profile that is formed by an endless belt of flexible material, movable in the circumferential direction of the profile, while means are provided to give a rotary movement to the belt.

Of such elements, whose rotary profile-surfaces aim at improving the effect of the stream on the element, various designs are known in the art. In these known designs the belt is passed over rollers, of which at least one is driven and of which the number is greater in proportion as one wants to approximate the desired profile more closely. Of such elements designs are known with several belts that each have several guiding-rollers and each form a part of the profile.

The drawback of the known elements is that they are either restricted to simple profile shapes that are not capable of yielding the desired results, or have a complicated, vulnerable and heavy construction and, therefore, are not fit for the application aimed at. As a result, the known designs have never evolved past an experimental stage and the possibilities which in principle exist have not been found applicable for the improvement of airplanes, ground-effect machines, flow engines and the like.

It is the object of the invention to provide an aerodynamic or hydrodynamic element of the type defined above that because of its simple construction weighs little, has a great reliability in operation and nevertheless offers a great freedom in choosing the profile shape.

For this purpose the element according to the invention is characterized in that for guiding the belt in its rotary movement the element is provided with a fixed plane, bent in accordance with the profile to be followed by the belt and with means for maintaining a lubricating-film between this plane and the belt.

As the belt is passed over the bent stationary plane instead of a number of rotating rollers, hardly any restrictive constructional consequences arise for choosing a profile. The belt is like a sliding skin of the element and can always be combined with the profile that for the envisaged application of the element is the most favorable. Consequently in a great variety of instances the advantages of a sliding skin can be fully made use of for the improvement of the efficiency or the controllability of the action of the element.

For the lubricant that is present as film between the belt and its guiding-plane, in most applications the fluidum will be used of which consists the stream co-operating with the element, because any mixing of lubricant with that stream of fluidum or vice versa then does not present any difficulty. There may be circumstances, however, in which the use of a different lubricant is better or necessary.

For maintaining the lubricating-film, the guiding-plane is, according to a further characteristic of the invention, provided with openings that are connected with means for feeding the lubricant under excess pressure.

These openings could be evenly distributed in the longitudinal and circumferential directions of the profiled part of the element, but it has been found that in most cases this distribution is not satisfactory, because of the great differences between the local radii of curvature of most of those profiles. For the tensile stress that is present in the rotating belt as a result of lubricant pressure is substantially equal over the entire circumference, due to the absence of considerable tangential external forces, so that the pressure the belt exerts on the lubricating-film depends on the local radius of curvature. The local differences in the thickness of the lubricating-film, which would be the result of this at an even distribution of the lubricant supply, are, at the usual differences between the radii of curvature, inadmissably great for a good guidance of the belt.

In order to solve this problem the element according to the invention is further characterized in that the lubricant-feeding openings are provided in those parts of the guiding-plane whose radii of curvature are smaller than those of the adjoining parts. In this way the necessary differences in pressure in the lubricating-film can be obtained without inadmissably great differences in the thickness of the lubricating-film.

In the parts with great radii of curvature the guiding-plane can also be furnished with lubricant-feeding openings, provided the lubricant is fed to these openings under a lower pressure than to the openings in parts with smaller radii of curvature. These provisions are in particular suitable for those elements whose lengths of the profiles, and consequently breadths of the rotating belts, are not too great in relation to the circumferences of the profiles, because then the lubricant may escape laterally from the gap between the guiding-plane and the belt.

For belts whose breadths are great in relation to the circumference of the profiles, the parts of the guiding-plane with great radii of curvature are preferably provided with openings that are connected with a lubricant discharge. In the discharge flow resistances or other means may have been provided in order to maintain a certain pressure locally at the discharge openings in the guiding-plane.

Driving of the rotary movement of the belt can be effected in the way known in the art with the aid of a rotating roller, for which purpose the guiding-plane must be interrupted locally.

These provisions, however, are an undesirable complication and in order to avoid this a preferential embodiment of the element according to the invention is further characterized in that the guiding-plane is provided with shallow grooves that run from the lubricant-feed openings in a direction that with the rotary direction of the belt encloses an angle of less than 90°.

The flow in the lubricating-film from the feed openings to the spots with a lower lubricant pressure experiences a smaller resistance in the direction of the grooves than in the opposite direction where there are no grooves, so that the flow in the direction of the grooves prevails and the frictional forces that the lubricant stream exerts on the belt, mainly work in the direction of the grooves, too.

This explains why, with the aid of the grooves, the belt can be driven by the supply of lubricant, so that the usual drive by means of a rotating roller can be left out.

With oblong profiles that occupy a certain position in the stream of fluidum, a rotational flow of the fluidum around the element occurs. This rotational flow may support the drive of the belt and in exceptional cases perhaps take it over entirely.

Elements in which the lubricant is entirely or largely discharged laterally, are preferably designed with grooves that diverge in the direction of rotation of the belt. In elements with very broad belts, which have lubricant-discharge openings in the guiding-planes, the grooves are provided on the contrary parallel to the direction of rotation of the belts.

Diverging grooves have another advantage in that they stabilize the position of the belts transversely, provided the grooves do not reach as far as or beyond the edges of the belts.

When the belt is displaced the flow in the lubricating-film gets an opposite transverse component, which exerts a stabilizing transverse force upon the belt.

The invention is further elucidated below with reference to some embodiments of aerodynamic or hydrodynamic elements according to the invention, which are schematically shown in the drawing.

Figure 2:
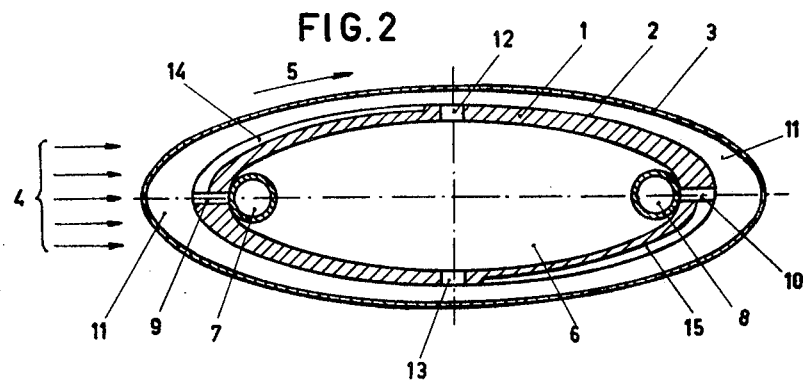
Figure 3:
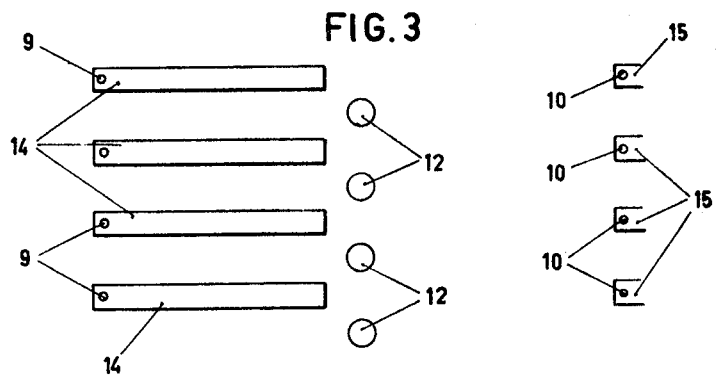
Figure 4:
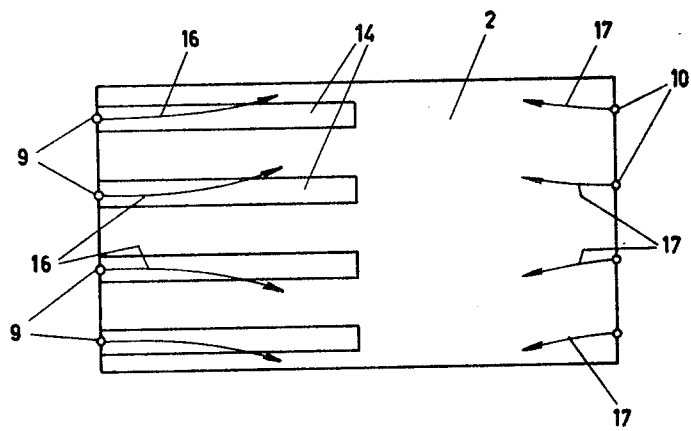
Figure 5:
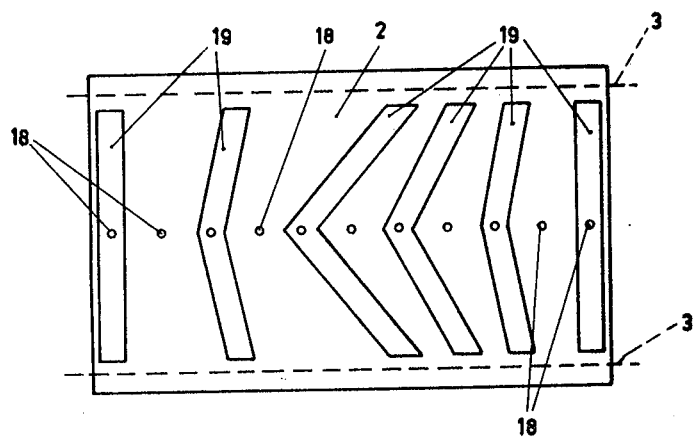

The drawing shows in:

FIG. 1: a perspective view of a part of an element according to the invention;

FIG. 2: a cross-section of an element according to the invention;

FIG. 3: the mutual positions of the openings and grooves in the guiding-plane of the element according to FIG. 2;

FIG. 4: the guiding-plane of an other embodiment of an element according to the invention;

FIG. 5: the guiding-plane of still an other element of the invention.

The element that FIG. 1 shows partially and which for instance can be a wing of an airplane or a blade of a helicopter screw, consists of a fixed core 1, whose surface 2 has the same oval profile over the whole length, and a sleeve or endless belt 3, which has been slid over core 1. Sleeve or belt 3, which consists of flexible, pliable material, runs across the entire length of core 1; in circumferential direction belt 3 fits on core 1 with a slight clearance. In the drawing a part of belt 3 is left out in order to show surface 2 more clearly.

When core 1 with belt 3 is placed in a stream of air 4, it experiences a force from the latter, which force can have, besides a component in the direction of flow, a component perpendicular to the direction of flow and the longitudinal direction of core 1. This perpendicular component depends on the shape of profile plane 2 and on the position the latter occupies in relation to the direction of flow. In the example shown the direction of flow is parallel to the longest diameter of the profile and the profile is symmetrical in relation to the longest diameter.

In this instance no force is exercised perpendicular to the direction of flow.

When, however, belt 3 is brought into a rapid rotating movement around core 1, as indicated by arrow 5, the phenomenon known as the Magnus effect occurs, in that air stream 4 exercises a vertical force on belt 3. This force, which is transmitted by belt 3 on to profile plane 2 and core 1, works upward in the arrangement shown if belt 3 moves in the direction of arrow 5.

In its rotation around profile plane 2 belt 3 is guided and supported by a lubricating-film present between profile plane 2 and belt 3. In the example described, which is used in a stream of air, air is used as a lubricant, so that the substantially unavoidable leakage of lubricant past the edges of belt 3 has no undesirable effects and does not require special provisions.

The more detailed cross-section in FIG. 2 and the view of profile plane 2 in FIG. 3 show in what way the lubricating-film and the rotating movement of belt 3 are obtained and maintained.

Fixed core 1 is of a thin-walled hollow construction, which embraces space 6. Herein channels 7 and 8 are provided at the locations of the highest curved parts of profile plane 2. Via the row of openings 9 channel 7 is connected with gap 11 between surface 2 and belt 3 and so is channel 8 via the row of openings 10. Space 6 is, at the top, connected with gap 11 at the location of the least curved parts of profile plane 2 via openings 12 and, below, via openings 13. Channels 7 and 8 are connected with an air compressor mounted elsewhere and not shown in the drawing. Space 6 is communicated with the open atmosphere.

The air that is fed to gap 11 through channels 7 and 8 via openings 9 and 10, flows on either side through gap 11 towards discharge openings 12 and 13 and at the same time exerts a pressure on to belt 3, which as a result comes under stress.

As a result of this stress belt 3 in its turn exerts a pressure on the air in gap 11. As this pressure highly depends on the curvature, there are large differences from place to place; the pressure is the largest where the curvature is the highest, that is at openings 9 and 10, where the air is fed to gap 11.

In the way that is known in the art of aerostatic and hydrostatic shaft bearings and similar supports, a balance sets in between on the one hand the stress in belt 3, the local curvature of belt 3 and the pressure of air stream 4 working externally on belt 3, and on the other hand the local width of slit 11, which at the given supply pressure of the air results in such a distribution of pressure in gap 11, that it exerts the necessary counter-pressure on belt 3. This equilibrium is very stable, so that the pressures working externally on belt 3 have only a small influence on the gap-width.

In order to get belt 3 in the desired rotary movement, surface 2 is provided with grooves 14 and 15. The depths of these grooves are small, i.e. approximately as large as up to some times larger than the average width of gap 11. In this context it is remarked that in the drawing the width of gap 11 and the depths of grooves 14 and 15 for the sake of clarity are shown highly enlarged.

Grooves 14 run from openings 9 to near openings 12; accordingly grooves 15 run from openings 10 to near openings 13.

The effect of grooves 14 is that the air that is fed to gap 11 through openings 9 does not divide itself in the directions of openings 12 and 13 equally, but that the flow between openings 9 and 12 is greater than that between openings 9 and 13. Thus, the former flow exerts a greater friction on belt 3 than the latter. Likewise belt 3 experiences more friction from the flow from opening 10 to opening 13 than from that from opening 10 to opening 12.

As a result of the disparity of the forces belt 3 experiences from the various flows in gap 11, belt 3 starts rotating in the direction of arrow 5. The rate of rotation is closely related with the rates of flow in gap 11; this opens up the possibility to adjust the rate of rotation with the aid of the pressure in air supply channels 7 and 8 and to influence the behavior of the wing with respect to flow of air 4.

In the design described for profile plane 2, in gap 11 no or only slight flows of air occur in the longitudinal direction of profile plane 2. Therefore, this design is suitable for wings and the like with a large ratio of the length and the circumference. For those cases in which the ratio of the length and the circumference is less great, the variant according to FIG. 4 can be applied.

In this design discharge openings 12 and 13 shown in FIG. 3 are absent and the air flows laterally out of the gap according to arrows 16 and 17. The operation is otherwise the same. This design can also be applied for great ratios of the lengths and the circumferences of the profiles, if the broad belt is replaced by a number of narrower belts that with some interspaces lie side by side.

FIG. 5 shows still an other variant, which is not suitable for very broad belts either. In this design profile plane 2 has a number of air supply openings 18 distributed in circumferential direction, and grooves 19 connected to them. There are no discharge openings, so that the air flows out of the gap laterally. Owing to the slant position of grooves 19 the flow of air in the gap has a component in the circumferential direction of profile plane 2 and the belt is set in rotation.

To the various openings 18 the air must be fed under a pressure that is in agreement with the extent of curvature of profile plane 2. Therefore, this design requires more elaborate provisions, but this is offset by a greater suitability and adaptability to more complicated profile shapes.

Grooves 19 in guiding plane 2 that do not reach as far as the edges of belt 3, which is indicated by dotted lines, have the accidental effect that they counteract transverse displacements of belt 3.

For when belt 3 shifts to one side, the stream of lubricant in that direction decreases due to the increased resistance of outflow. At the same time the stream to the other side increases due to the locally decreased outflow resistance. The result is a transverse component in the lubricant-stream and a transverse force on belt 3, which is directed against the displacement and tries to restore belt 3 into its original position.

I claim:

1. An aerodynamic or hydrodynamic element profiled to experience in a fluid stream a force with a component transverse to the direction of fluid flow comprising a profiled body; an endless belt of flexible material positioned over at least part of the length of said profiled body and corresponding to the external profile of said body, said belt movable in the circumferential direction of the profiled body; means within said profiled body for supplying a pressurized fluid to the space between said profiled body and said belt; and groove means in the surface of said body for distributing said pressurized fluid in the space between said belt and profiled body, whereby the fluid supports the belt and provides a rotary movement of said belt around said profiled body.

2. An element according to claim 1, wherein said profiled body is provided with openings connected with means for feeding the pressurized fluid to said space.

3. An element according to claim 2, wherein the fluid feeding openings are located in those parts of the profiled body whose radii of curvature are smaller than those of the adjoining parts.

4. An element according to claim 3, wherein those parts of the profiled body with greater radii of curvature have openings connected with means for maintaining a lower fluid pressure than in the fluid feeding openings in those parts with smaller radii of curvature.

5. An element according to claim 4, wherein the openings in parts of the profiled body with greater radii of curvature are connected with a fluid discharge means.

6. An element according to claim 3, wherein the profiled body is stationary and is provided with shallow grooves that run from the fluid feeding openings in a direction that with the rotary direction of the belt encloses an angle of less than 90°.

* * * * *